(12) United States Patent
Switkes

(10) Patent No.: US 6,565,165 B2
(45) Date of Patent: May 20, 2003

(54) COMPACT ERGONOMIC WEATHERPROOF MOBILE WORKSTATION

(76) Inventor: Harvey Donald Switkes, 414 Holly Dr., Annapolis, MD (US) 21403

( * ) Notice: Subject to any disclaimer, the term of this patent is extended or adjusted under 35 U.S.C. 154(b) by 57 days.

(21) Appl. No.: 09/759,198

(22) Filed: Jan. 16, 2001

(65) Prior Publication Data

US 2001/0048268 A1 Dec. 6, 2001

Related U.S. Application Data

(60) Provisional application No. 60/176,757, filed on Jan. 19, 2000.

(51) Int. Cl.[7] .............................................. A47B 46/00
(52) U.S. Cl. .................. 312/249.13; 312/283; 312/310; 144/285
(58) Field of Search ............................... 108/33, 38, 39; 312/290, 321.5, 100, 289, 249.13, 257.1, 263, 283, 310, 902; 296/24.1; 144/285, 286.1, 286.5, 287; 206/373; 269/901, 289 R (56) References Cited

U.S. PATENT DOCUMENTS

| | | | | |
|---|---|---|---|---|
| 1,287,175 A | * | 12/1918 | Anderson | |
| 1,547,846 A | * | 7/1925 | Tonnesen | |
| 2,630,362 A | * | 3/1953 | Bass | |
| 2,962,293 A | * | 11/1960 | Malami | 144/286.1 |
| 4,613,999 A | * | 9/1986 | Franco et al. | 5/400 |
| 5,018,563 A | * | 5/1991 | Yoder | 144/286.1 |
| 5,099,529 A | * | 3/1992 | Anderson | 5/400 |
| 5,329,979 A | * | 7/1994 | Miller et al. | 144/285 |
| 5,383,698 A | * | 1/1995 | Buchholz | 296/24.1 |
| 5,725,037 A | * | 3/1998 | Faulhaber | 144/285 |
| 5,997,116 A | * | 12/1999 | Schmidt | 312/289 |
| 6,237,659 B1 | * | 5/2001 | Francis | 144/286.1 |

FOREIGN PATENT DOCUMENTS

| | | | | |
|---|---|---|---|---|
| DE | 3502646 | * | 7/1986 | 312/283 |
| GB | 2132546 | * | 7/1984 | |

* cited by examiner

*Primary Examiner*—Lanna Mai
*Assistant Examiner*—Hanh V. Tran (57) ABSTRACT

A composite workstation offers multiple compartments, which are created by joining structural panels in perpendicular, parallel, and opposing horizontal configurations. Compartments its may contain tools, and supplies that can rapidly be accessed for use or readily secured and protected, by a single user in a field or shop application. This workstation uses individual panels, joined at intersections to form a composite self-supporting structure. The structure is configured to offer its top surfaces as a worktable. Equipment that is stored inside the compartments are engaged into useful position by utilizing leverage, pulleys, and mechanical advantage. The configuration of the structure enables dangerous and unwieldy equipment to be easily and safely used with proper off-feed surfaces and stable support in any location to which it is transported. The focus of this workstation is towards woodworking. The compact scale of the structure enables conventional compact vehicles to make the workstation mobile.

20 Claims, 10 Drawing Sheets

FIG 15

COMPACT ERGONOMIC WEATHERPROOF MOBILE WORKSTATION

This application claims the benefit of Provisional application Ser. No. 60/176,757, filed Jan. 19, 2000.

BACKGROUND OF THE INVENTION

1. Field of Invention

The present invention is a multi functional portable workstation and tool storage box that also offers itself as a workbench. This invention provides a compact weather tight and fully secured workstation. Unlike other workstations, this invention provides a highly stable work surface, along with mechanical platforms that have power tools that are too heavy for one person to safely lift into the proper ergonomic work position. Due to the compact nature of the design and its ability to retract tools into its storage area, its top surface is at height that allows it to become a large work surface and off feed table, as would normally be used in a conventional woodworking shop.

2. Description of Prior Art

In the field of commercial and residential construction, tradesmen are required to bring a large variety of tools to the job site, some hand tools and some "portable power tools". The process of getting these tools to the work site, placing them in an accessible location for work, setting up work tables, and work surfaces for the portable power tools, and off feed tables, and hooking up the power supplies to all necessary tools, is time consuming and physically difficult and prohibits a tradesmen from working without a helper. The procedure of packing up and securing the job site is equally as hard.

The Faulhaber U.S. Pat. No. 5,725,037 entitled "Mobile Tool Storage Box and Work Bench Combination" teaches that a tool box may offer an arrangement of individual storage compartments for tools and enables work surfaces to be offered by means of assembling various arm supports and surfaces that must be stored, assembled and then disassembled. These components would consume a substantial amount of interior space that would limit the capacity for tool storage and involve some degree of set up and break down at the work sight. This device does not offer protection from water infiltration.

The Robbins et al U.S. Pat. No. 4,133,572 entitled "Utility Trailer" shows a trailer that is too tall to facilitate using the top of the structure for a work surface. Furthermore, because of its height, it offers visual and audible impairment to the tradesmen using it. The utility trailer does not offer small enough compartments to make tool storage and organization efficient.

The Buchholz U.S. Pat. No. 5,383,698 entitled "Tool Trailer With Open End" shows a table saw area that is limiting because it does not present an off feed table and it will not accommodate cutting a full standardized 4'x8' panel of sheet goods. Also, it does not offer large work surfaces. Furthermore, the tandem wheel design indicates that its too cumbersome for the towing capacity of a compact truck or car. Due to the nature of its construction methods, it does not have substantial structural rigidity without being supported by its trailer frame, so enabling it to be mobile by replacing the trailer frame with legs and casters would be unworkable.

SUMMARY

A portable weatherproof workstation having a secured storage/mobile mode as well as an operable mode in which tools and equipment that would normally be to heavy for one person to safely manipulate, are offered for use by professional and non-professionals alike.

The workstation is comprised of four general compartments. Two compartments have permanently sealed covers on top, offering access through side panel doors. A third compartment is accessed from the top by a large lid (reinforced to prevent torsional movement during opening and closing of said lid); this enables a single user to operate a relatively large panel door easily from either end. The process of opening this horizontal access lid fully, 180 degrees, simultaneously offers the underside of the lid as a work table. The last and fourth compartment is a general storage area open at the top or at one end of the workstation. This general storage area may be considered for equipment fixed to the workstation (compressor, generator) and offers general storage of miscellaneous tools such as shovels, levels or materials.

Vertical doors open to a horizontal attitude to access compartments and also offer horizontal work surfaces while those compartments are being used. These compartments may be subdivided by shelves and bulkheads offering versatility to specific needs. The top of the workstation is at a height that enables it to be a work surface. Materials may be placed on it or clamped to it. The overall height of the workstation offers unobstructed visual and audible exposure to the work environment. The heavy portable equipment that is necessary in field use (table saw, plainer, and miter saw), is offered to the user by means of mechanical advantage (i.e. pulleys, roller glides and hinges), enabling a single user to set up the workstation and than to shut down easily and quickly; never having to lift the full weight and load of said equipment.

There are two methods of supporting the invention that make it mobile. One method is to secure it to a traditional chassis trailer and the other method is to mount the workstation on legs and casters.

The doors accessing the workstation on the vertical surfaces are made weather tight by conventional tubular weatherproofing gaskets.

Security on all accessed doors is achieved using conventional locking vehicle hardware.

The strength in the workstation structure is achieved by joining structural panels with mechanical fasteners and adhesives of a flexible nature at the panel intersections. The spacing of the compartment panels and their connection to each other offers rigidity that is necessary to endure deflection and shock loads that would occur while traveling over an irregular surface.

The mass of the workstation enables a stable work platform for handling equipment and material stock. The workstation is of a scale that enables a single person on a relatively level surface to maneuver it to a convenient location for work to be performed without the use of a tow vehicle.

The mobile aspect of the work station does not preclude its use as a stationary outdoor unit, were security, weatherproofing, workbench, tool organization and access are necessary (i.e. outdoor wood shop where other facilities are not feasible).

BRIEF DESCRIPTION OF DRAWINGS

The invention will be better understood in view of the following descriptions presented with reference to the accompanying drawings:

FIG. 15 is a plan view of the invention showing where sectional figures have been cut from.

DETAIL DESCRIPTION

Figure 10:
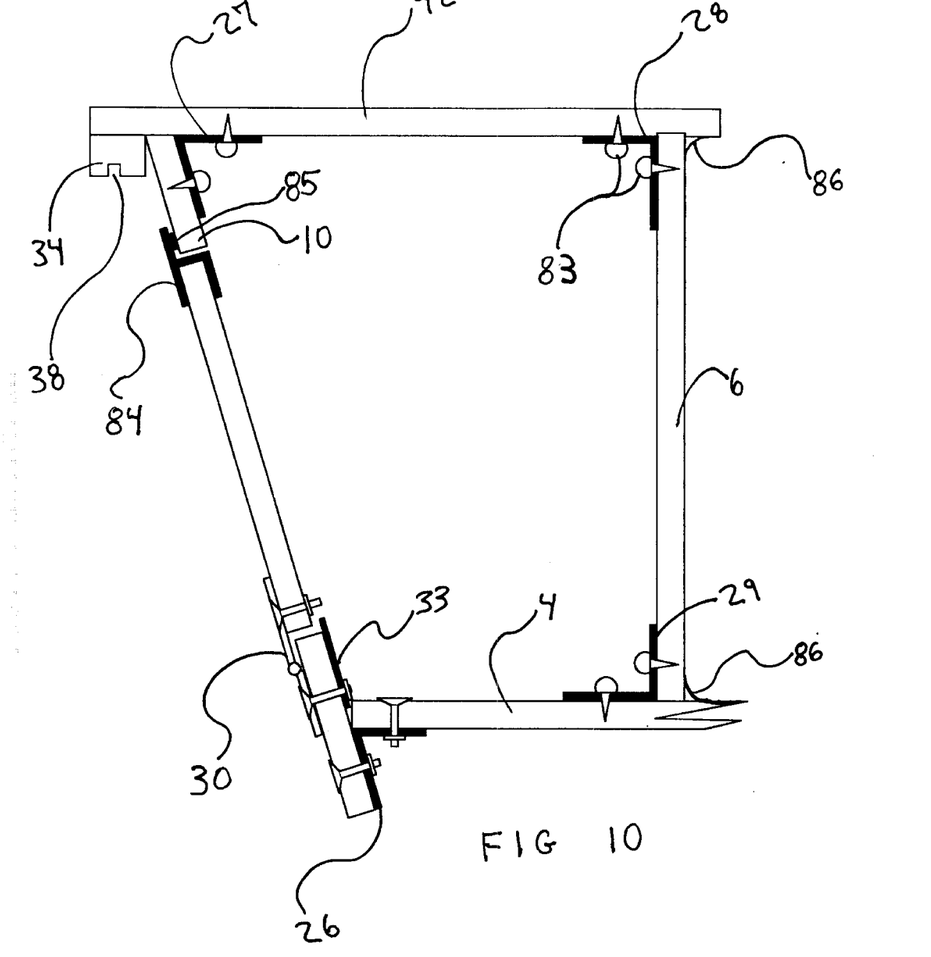
FIG. 10 is an enlarged view (sect. D—D FIG. 15) with the vertical access door closed.

My "Compact Ergonomic Weatherproof Mobile Workstation" is constructed of ½" plywood panels or a similar structural material. Corner posts 46 in FIG. 8 and longitudinal members 26, 27, 28, and 29 in FIG. 10 are constructed of metal or similarly strong products.

Figure 3:
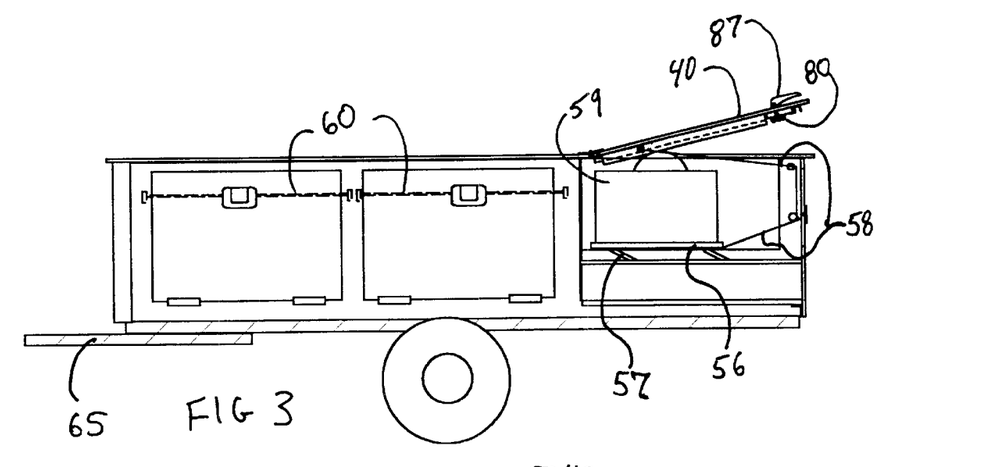
FIG. 3 is an elevation of the left side of the invention according to FIG. 1.

In FIG. 3, I have illustrated a preferred embodiment of my "Compact Ergonomic Weatherproof Mobile Workstation" on a conventional utility trailer 65 that enables the workstation to be transported to any location where a tow vehicle can get to. Being on a utility trailer offers the versatility for accessing different work locations.

Figure 2:
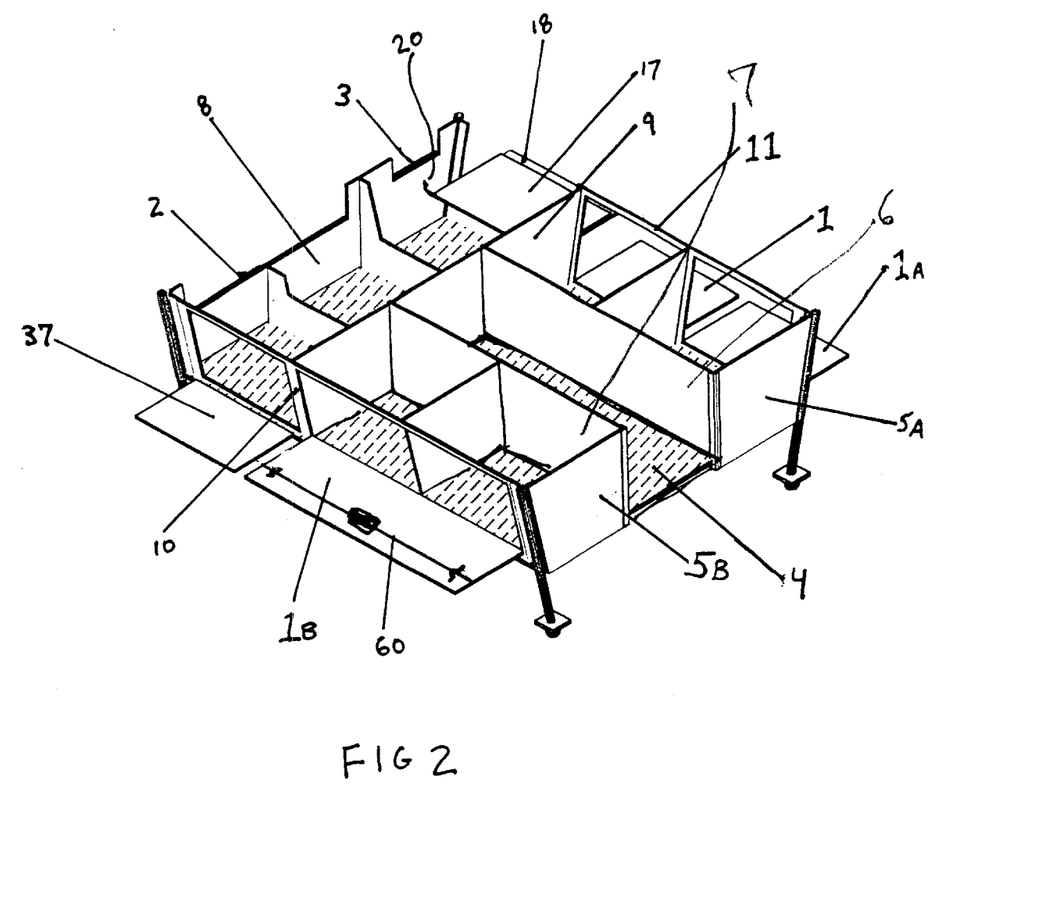
FIG. 2 is a perspective view of the invention according to FIG. 1 with the work surfaces removed.
Figure 11:
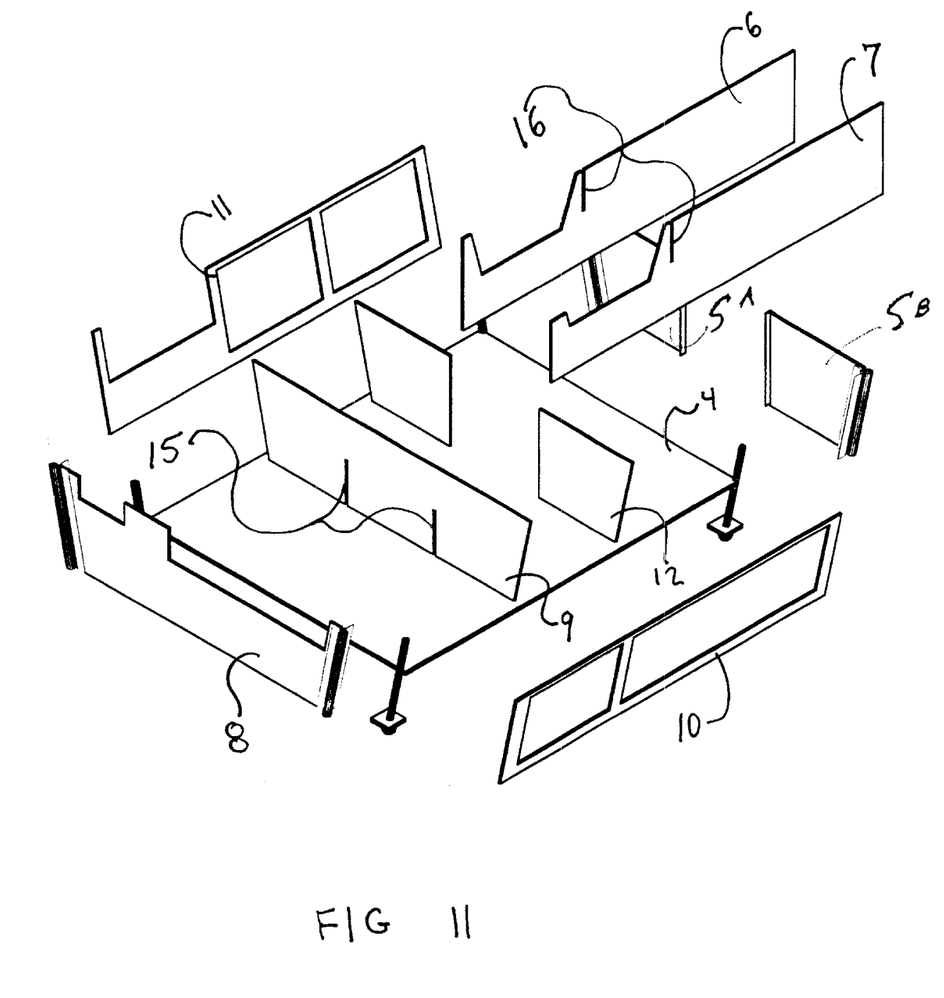
FIG. 11 is a perspective view of the housing elements according to FIG. 2 without doors

FIG. 2 is shown with its dqors 1, 1a, 1b & 37 in a horizontal open position. Doors 2 and 3 open 180 degrees to allow easy access. A bottom or floor area 4 extents to the perimeters of the structure forming a lateral stiffening member and the bottom of the storage unit. The bulkheads 6&7 extend from end to end continuously within the unit with notches 16 interlocked with notches 15 on bulkhead 9 as shown in FIG. 11. Bulkheads 9 and end panel 8 offer structural rigidity and can be used for dividing compartments. Bulkheads 12 subdivides tool storage compartments and also offer support to floor member 4 and top surface member 42 from deflection.

Figure 1:
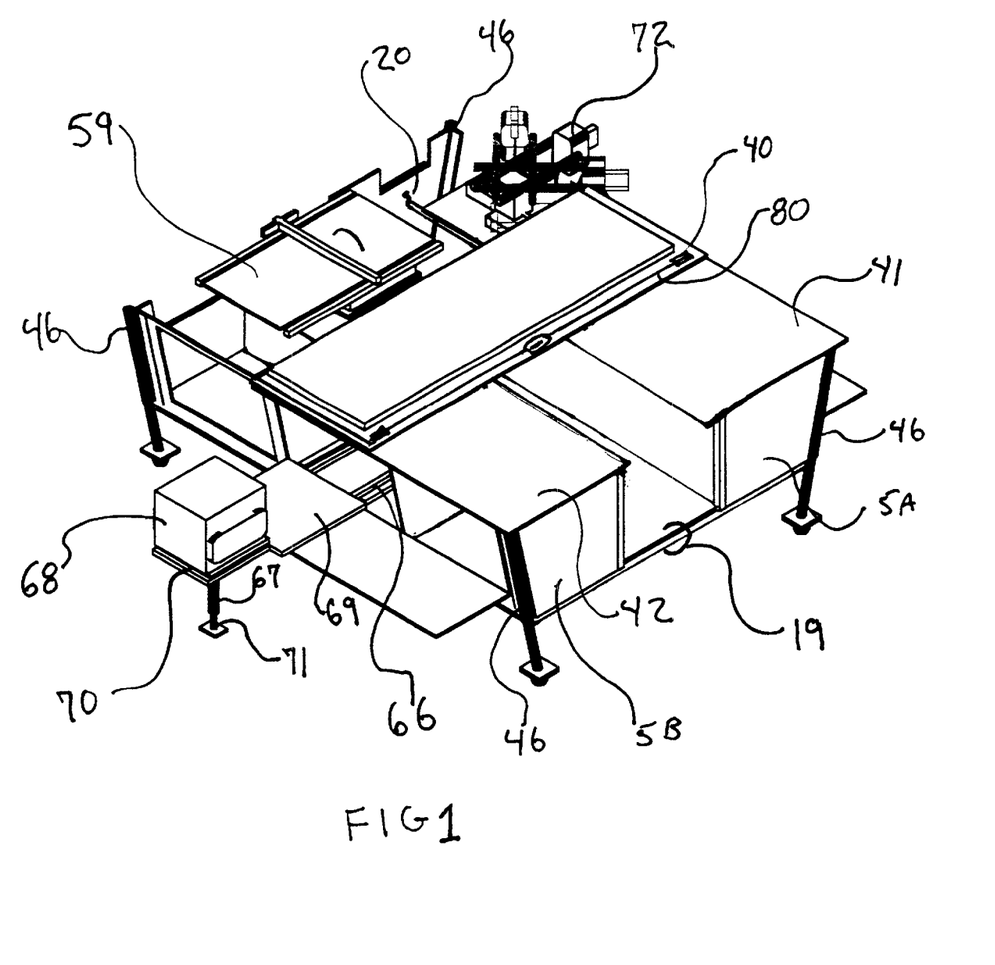
FIG. 1 is a perspective view of the invention according to FIG. 2 looking towards the general tool storage area with three typical portable power tools (table saw, miter saw, thickness plainer) in operable position. The horizontal access door is in open position.

In FIG. 1 horizontal structural member 19 is a stiffening member that supports the open end of the work station and is made of metal. Its purpose is also to join panel 5 to the floor surface 4. The horizontal structural member 19 spans the entire width of the workstation and must support the loads across that distance due to the cut out area in the center between panels 5a and 5b. Bulkheads 6 and 7 have been cut away to leave access to tools and equipment in the horizontally accessed compartment leaving enough mass to still maintain a supporting member for the area.

Figure 5:
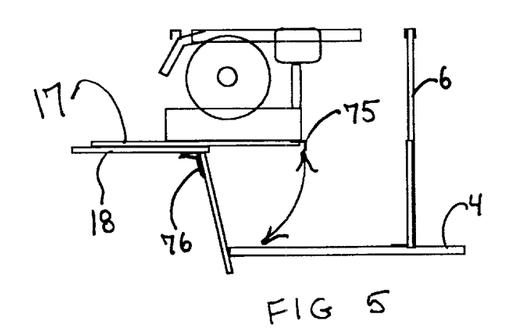
FIG. 5 is a sectional view (sect. A—A FIG. 15) of the invention according to FIG. 1 showing the miter saw in the operable mode.

In FIG. 2, doors 1,1a, 1b, & 37 are hinged open and maintained in a horizontal position by means of chain 77 (FIG. 7) to offer those doors as horizontal work surfaces while in the open position. Conventional hardware 60, latches doors shut and secures them. Access door 2 & 3 offers extra access to the horizontal lid compartment. 17 is a tilting table shown in detail in FIG. 5 and FIG. 6. The tilting table 17 is attached to door 18 which pivots by conventional hinge 76. It opens to a horizontal position when necessary to bring a tool into a functional work area bringing horizontal structural member 75 into a locked position secured by a conventional elbow clip 20 connected at bulkhead 9 and end panel 8.

Figure 6:
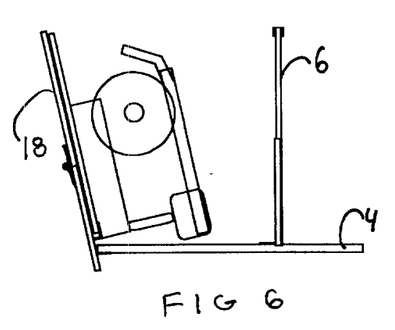
FIG. 6 is a sectional view (sect. A—A FIG. 15) of the invention according to FIG. 5 showing miter saw in the retracted stored position.

FIG. 6 shows the retracted tool position with door 18 closed. Exterior panels 10 & 11 are reinforced by longitudinal members 26 & 27 in FIG. 10. Member 27 is continuous between end panel 5 to bulkhead 9. Panel 11 has a removed area to allow for tool access behind door panel 18.

Figure 12:
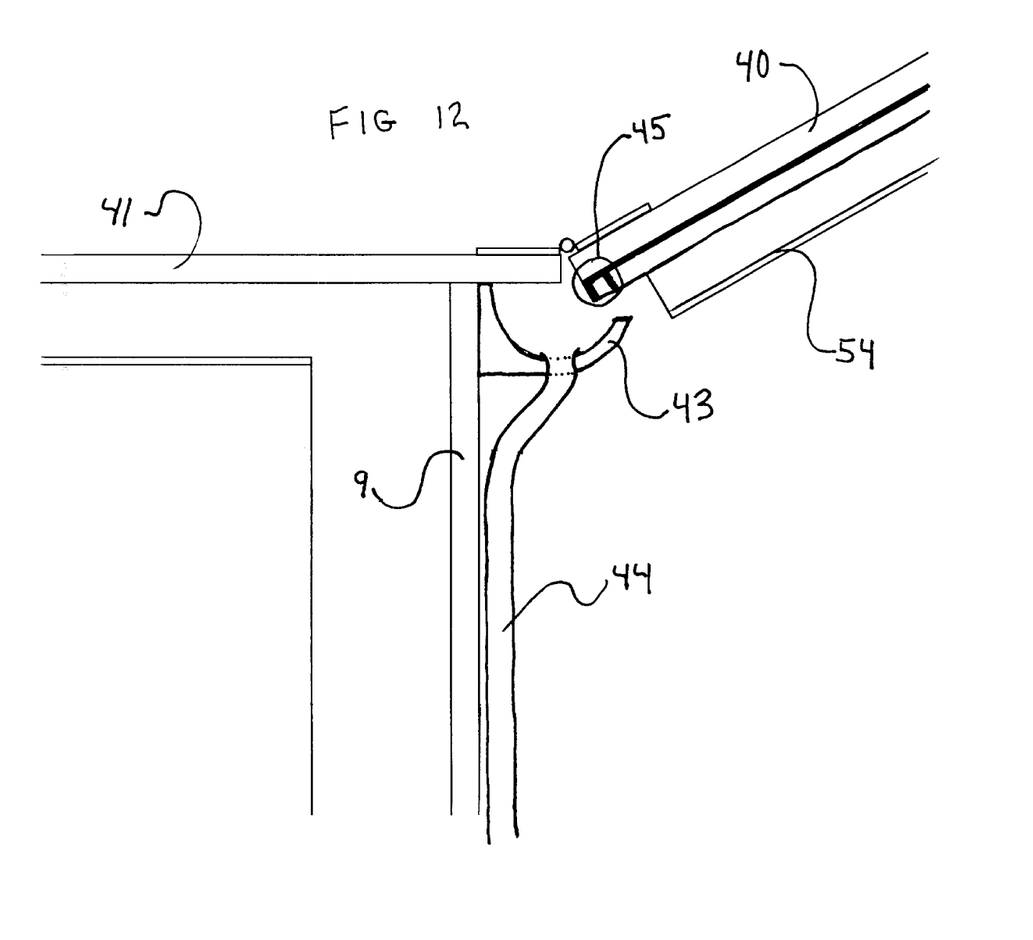
FIG. 12 is a sectional view along sect. line E—E of FIG. 3 showing the hinge gutter mechanism that allows the horizontally accessed storage compartment to keep the compartment weather proofed.

FIG. 12 shows gutter 43 which is continuous between panels 10 and 11. The purpose is to capture water that has entered at the hinged connection between operable panel 40 and fixed panels. Water entrapped in gutter 43 can be drained through a down spout 44 or can be drained through a perforation in side panels 10 and 11 where they intersect gutter 43. The gutter is constructed of water impervious materials such as PVC. Drip edge 45 attached to horizontal access door 40 surrounds the entire perimeter of horizontal access door 40 to prevent water infiltration into the horizontally accessed tool compartment between end panel 8 & bulkhead 9.

Figure 9:
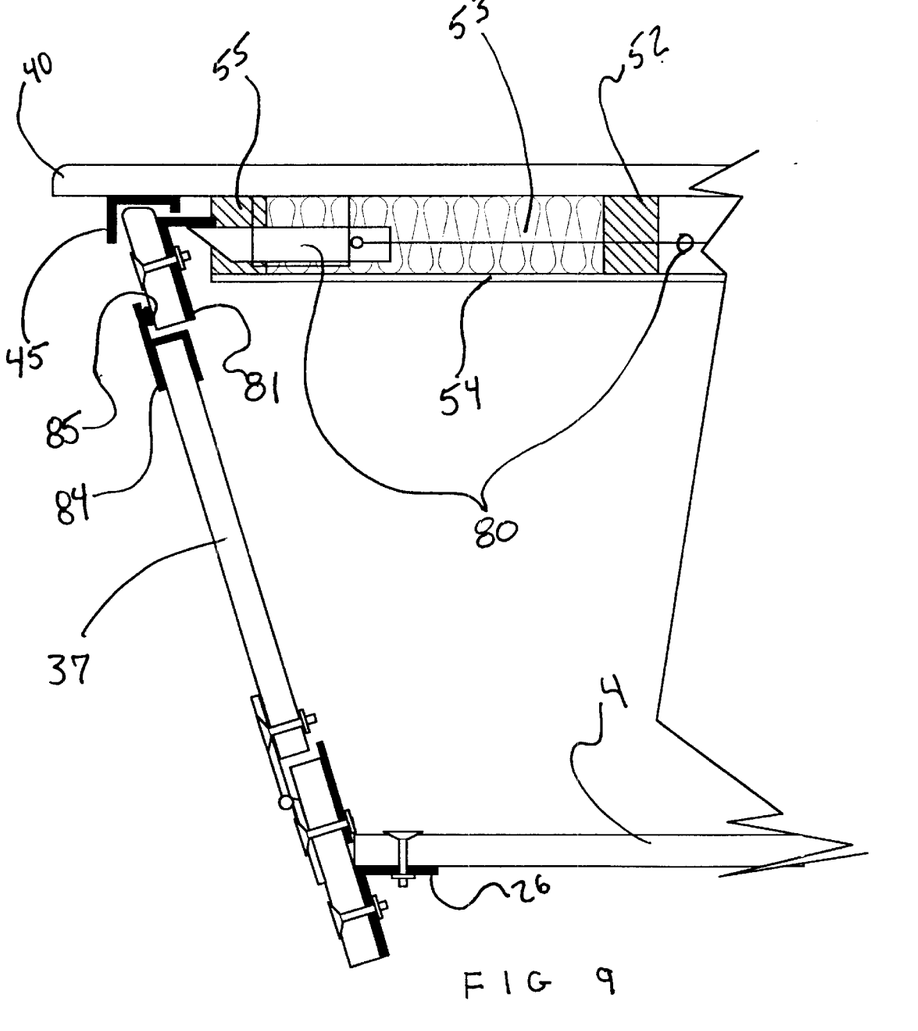
FIG. 9 is a sectional view along section line C—C of the invention according to FIG. 15 with the horizontal access lid closed.

Drip edge 45 is also seen enclosing side panel 10 in FIG. 9.

Figures 8, 14:
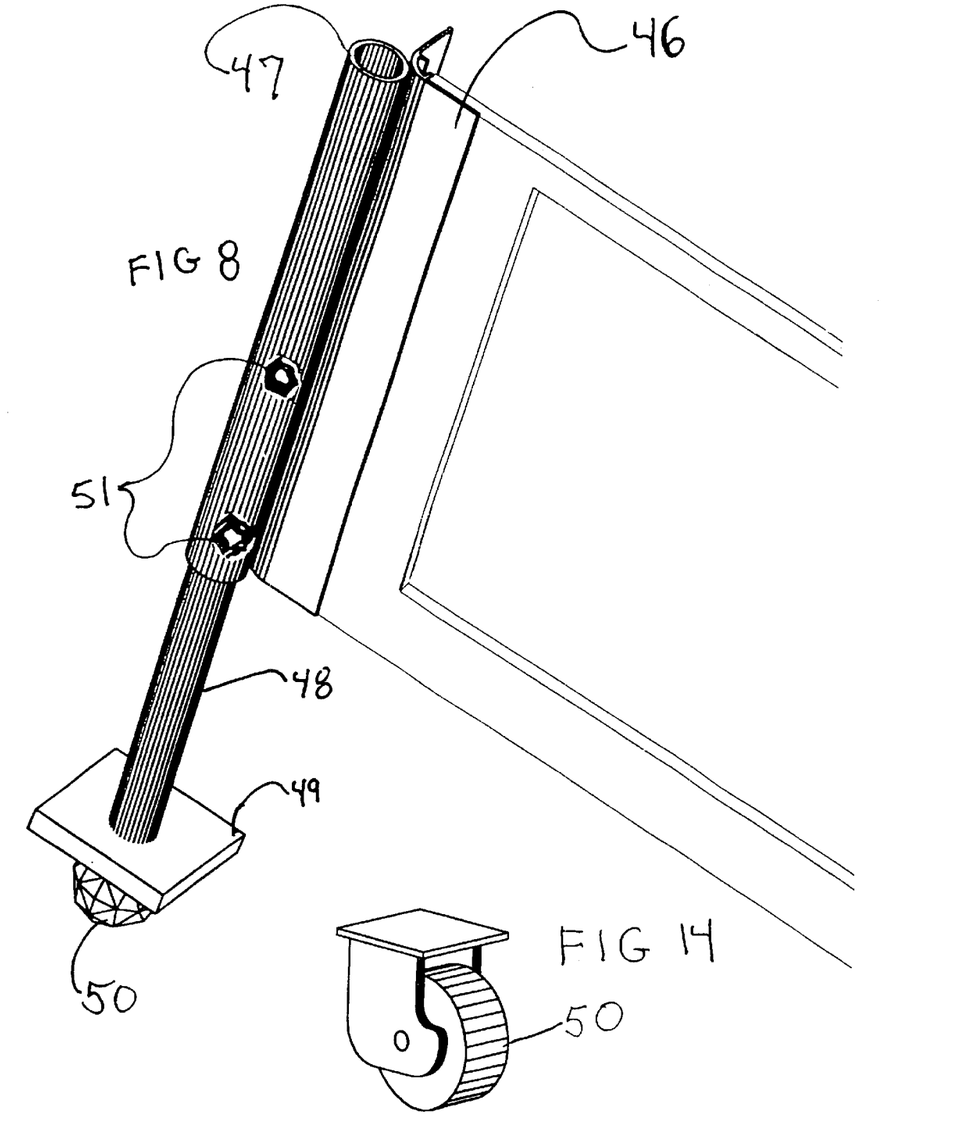
FIG. 8 is an enlarged view of a support leg connected to a corner post.
FIG. 14 is a perspective view of a conventional caster for the support of corner post 48 according to FIG. 8.

In FIG. 8 a corner connector 46 is shown attached to corner post receptor 47 with support leg 48 inserted into it. Adjustments to enable overall workstation height may be made by drilling holes into desired locations through both support leg 48 & post receptor 47 to receive connecting bolts 51. Support plate 49 enables conventional casters to be attached to support leg 48.

FIG. 9 shows a cut away section of horizontal door 40 with solid spacer members 52 and light weight panel separators 53 which forms a rigid lid which resists torsional loads. Due to the size and horizontal configuration of horizontal door 40 there is a need to keep said panel light weight yet fully rigid to enable easy maneuvering. This is achieved by using the same methods as hollow core door construction This involves separating horizontal panel 40 & off feed surface 54 and "sandwiching" between them a solid perimeter border 55 and solid spacer member 52. The light weight panel separator 53 is a semi structural craft honey comb panel separator or other filler product. Conventional latching mechanism 80 connects to bracket 81 when in a closed position and keeps horizontal access door panel 40 secured and is controlled by handle 87. Member 45 has a duel purpose displacing water from door panel 18, 3, 2, and 37, and also securing door panels 2, 3, and 18, when in a closed position.

FIG. 10 shows fixed panel 42 affixed to bulkhead 6 and exterior panel 10 by means of brackets 27 and 28. Floor panel 4 is affixed by horizontal member 26 and bracket 29. Mechanical fasteners 83 and adhesives are used for attaching brackets. Access panel border 84 has flexible weather seal 85 affixed to its edges which contacts the exterior panels to form a weather tight seal on the top and side edges of each vertical access door. Flexible adhesive caulk 86 is applied to all areas exposed to water infiltration where a mechanical drip edge is not present. Solid edge block 34 has groove 38 to allow water to shed from edge block 34. Plate 33 prevents possible water infiltration on lower edge of door openings. Conventional hinge 30 allows doors to pivot open to horizontal position.

Figure 4:
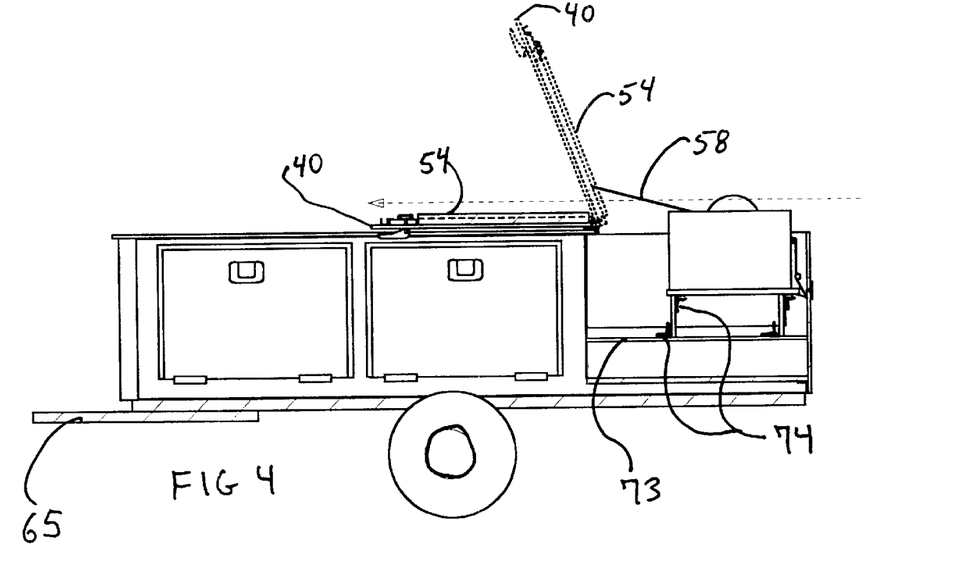
FIG. 4 is an elevation of the left side of the invention according to FIG. 3.

FIG. 3 shows a tool platform 56 in a retracted position, mounted on table supports 57 and connected to a cable/pulley assembly 58 which in turn is connected to door panel 40. When door panel 40 is opened it simultaneously exerts a pull on cable/pulley assembly 58 and brings tool platform 56 and the tool that is mounted on it (a table saw 59), this brings it forward to the user and up to an elevation that allows off feed surface 54 to align itself in plane with the table saw top 59, therefore enabling the off feed surface 54 to become the off feed table as seen in FIG. 4.

FIG. 3 shows conventional paddle latch hardware 60 securing door panels 1 and 1a as viewed through door panels 1, 1a, and side panel 11.

Figure 7:
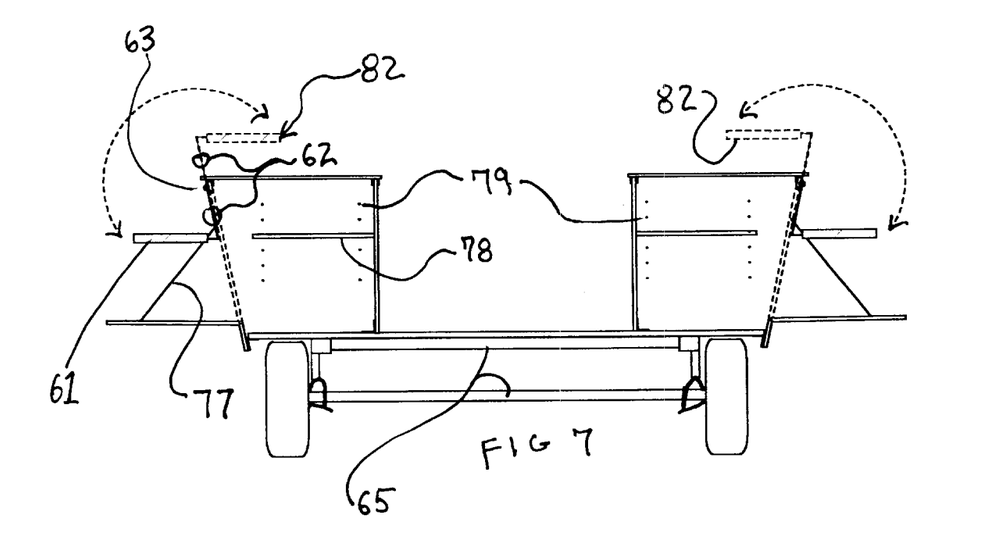
FIG. 7 is a sectional view (sect. B FIG. 15).

FIG. 7 shows a pivoting extension table 61 constructed using hollow core door construction, supported by a bracket 62 connected to a removable hinge 63. It is necessary for the pivoting extension table 61 to be easily raised out of the way to enable door panels 1, 1a, and 1b, to be opened and closed without removing said work surfaces from the work station. The pivoting extension table 61 is necessary for enabling miter saw use and is only a feature that may be added to the opposing side of the work station. Mechanism 77 maintains vertical access doors in a horizontal position to allow them to be used for small tool storage, while the workstation is in an operable mode. Mechanism 77 can be conventional hardware, chain or cable. Shelve 78 may be installed and made adjustable according to the users needs. Shelve key hole 79 in bulkheads 12, 9 and end panels 5a and 5b, is one method for achieving this. 82 shows the retracted position of pivoting work table 61.

FIG. 7 shows a sectional view of workstation mounted on a conventional utility trailer 65.

FIGS. 3 and 4 show the workstation mounted on a conventional utility trailer 65.

FIG. 1 shows the preferred mode by this inventor which is a carpentry workstation utilizing the three most common portable shop tools. Those tools are table saw 59, miter saw 72, and thickness planer 68. These shop tools are shown in an operable mode. The thickness planer 68 is brought into usable position by extracting it from the work station on platform 69 which rests on glides 66 and attaching threaded leg 67 to threaded receptor on panel 70 on which it is affixed. It is then pivoted, at the point of where panel 70 is attached by conventional hinges to platform 69, into an operable position resting on threaded leg 67 connected to panel 70. The exact adjustment of support leg 67 is achieved by rotating clockwise or counter clockwise threaded support foot and post 71. Tool support members 67 and 71 are stored independently when the workstation is in a retracted position Horizontal reinforcement member 19 must carry the load of the workstation for its entire width due to the cut out that allows access to the general storage area.

Figure 13:
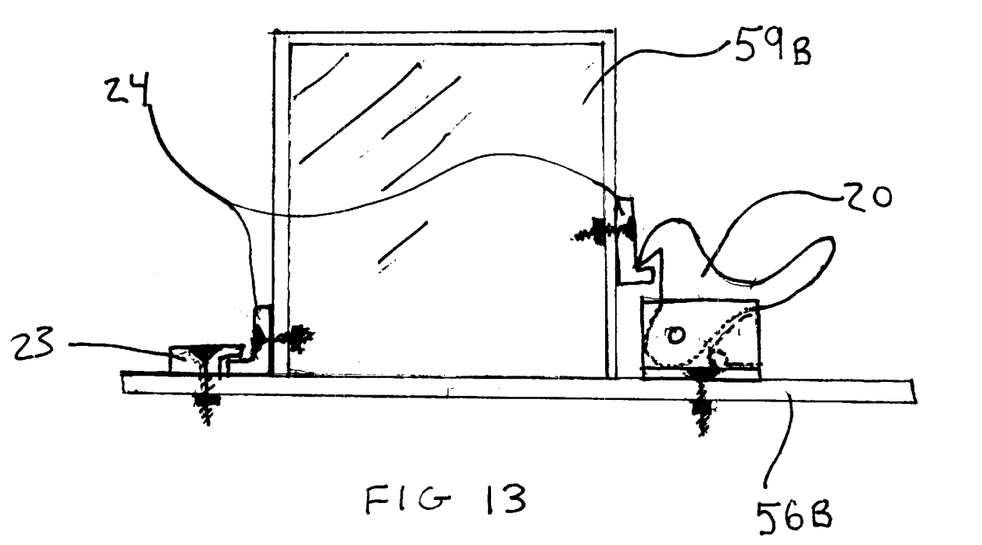
FIG. 13 is an elevation view according to FIG. 4 showing the attachment of a tool to a platform for purposes of easy removal.
Figure 15:
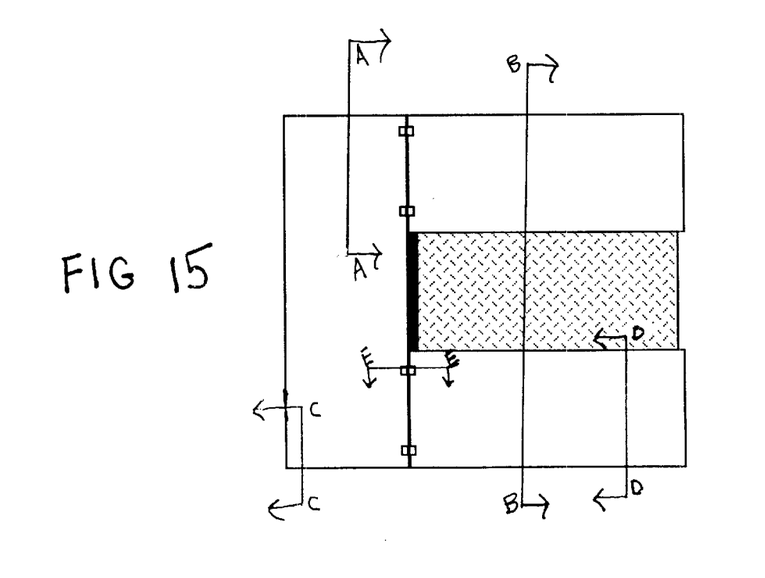

FIG. 13 shows a conventional elbow clip 20 and attachment bracket 23 affixed to a typical tool platform 56B.

Attachment brackets 24 are affixed to the tool housing 59B. One configuration as shown in FIG. 13 allows for simple removal and replacement of tools as needed.

I claim:

1. A portable weatherproof workstation comprising: a housing having a top closure and a bottom side spaced apart by a plurality of intersecting bulkheads; the bulkheads forming a plurality of compartments in the housing within a perimeter of the bottom side; two of the compartments each having an opening respectively located along two opposite sides of the housing; a first and a second portion of the top closure respectively fixed above the two of the compartments; a third of the compartments located along a third side with a longitudinal length thereof perpendicular to said two opposite sides and having a third portion of the top closure rotatably engaged on the first and second portion of the top closure which can be rotated to lie over the first and the second portion to form a working surface; and a fourth of the compartments between the two of the compartments open at a top and along a fourth side of the housing.

2. The workstation according to claim 1 wherein doors are respectively rotatably engaged along said bottom side to close the openings to the two of the compartments.

3. The workstation according to claim 1 further comprising a first tool platform engaged in the third of the compartments, first positioning means engaged to the third portion of the top closure and the first tool platform for moving the first tool platform up in the third of the compartments into a working position below the working surface when the third portion of the top closure is rotated to lie over the first and second portion of the top closure.

4. The workstation according to claim 3 further comprising a second tool platform rotatably engage in the third of the compartments on a side wall into a working position.

5. The workstation according to claim 1 wherein said housing is mounted on wheels.

6. The workstation according to claim 1 wherein said housing is mounted on adjustable legs each having casters on a free end thereof.

7. The workstation according to claim 1, wherein a gutter, inside the third of the compartments, is fixed between the two opposite sides of the housing and is fixed below edges of the first and second portion of the top closure to which the third portion is rotatably engaged.

8. The workstation according to claim 1 wherein a closing bulkhead is fixed along the third side of the housing.

9. The workstation according to claim 1 wherein two closing bulkheads are fixed along the fourth side extending respectively from side walls of the fourth of the compartment to two ends of the fourth side, wherein the fourth of the compartments are open on the fourth side.

10. A portable weatherproof workstation comprising: a housing having a top closure and a bottom side spaced apart by a plurality of intersecting bulkheads; the bulkheads forming a plurality of compartments in the housing within a perimeter of the bottom side; two of the compartments each having an opening respectively located along two opposite sides of the housing; a first and a second position of the top closure respectively fixed above the two of the compartments; a third of the compartments located along a third side with a longitudinal length thereof perpendicular to said two opposite sides and having a third portion of the top closure rotatably engaged on the first and second portion of the top closure which can be rotated to lie over the first and the second portion to form a working surface; and a fourth of the compartments between the two of the compartment open at a top and along a fourth side of the housing, wherein a gutter, inside the third of the compartments, is fixed between the two opposite sides of the housing and is fixed below edges of the first and second portion of the top closure to which the third portion is rotatably engaged.

11. The workstation according to claim 10 wherein doors are respectively rotatably engaged along said bottom side to close the openings to the two of the compartments.

12. The workstation according to claim 10 further comprising a first tool platform engaged in the third of the compartments and first positioning means engaged to the third portion of the top closure and the first tool platform for moving the first tool platform up in the third of the compartments into a working position below the working surface when the third portion of the top closure is rotated to lie over the first and second portion of the top closure.

13. The workstation according to claim 10 further comprising a second tool platform rotatably engaged in the third of the compartments on a side wall into a working position.

14. The workstation according to claim 10 wherein said housing is mounted on wheels.

15. The workstation according to claim 10 wherein said housing is mounted on adjustable legs each having casters on a free end thereof.

16. A portable weatherproof workstation comprising:

a housing having a top closure and a bottom side spaced apart by a plurality of intersecting bulkheads; the bulkheads forming a plurality of compartments in the housing within a perimeter of the bottom side; two of the compartments each having an opening respectively located along two opposite sides of the housing; a first and a second portion of the top closure respectively fixed above the two of the compartments; a third of the compartments located along a third side with a longitudinal length thereof perpendicular to said two opposite sides and having a third portion of the top closure rotatable engaged on the first and second portion of the top closure which can be rotated to lie over the first and the second portion to form a working surface; and wherein a first tool platform is engaged in the third of the compartments and first positioning means are engaged to the third portion of the top closure and the first tool platform for moving the first tool platform up in the third of the compartments into a working position below the working surface when the third portion of the top closure is rotated to lie over the first and second portion of the top closure.

17. The workstation according to claim 16 wherein doors are respectively rotatably engaged along said bottom side to close the openings to the two of the compartments.

18. The workstation according to claim 16 further comprising a second tool platform rotatably engaged in the third of the compartments on a side wall into a working position.

19. The workstation according to claim 16 wherein said housing is mounted on wheels.

20. The workstation according to claim 16 further comprising a fourth of the compartments between the two of the compartments open at a top and along a fourth side of the housing.

* * * * *